(12) United States Patent
Chiang

(10) Patent No.: US 8,340,902 B1
(45) Date of Patent: Dec. 25, 2012

(54) REMOTE VEHICLE MANAGEMENT SYSTEM BY VIDEO RADAR

(76) Inventor: Yan-Hong Chiang, Taipei (TW)

( * ) Notice: Subject to any disclaimer, the term of this patent is extended or adjusted under 35 U.S.C. 154(b) by 0 days.

(21) Appl. No.: 13/420,784

(22) Filed: Mar. 15, 2012

(51) Int. Cl.
*G05D 1/00* (2006.01)

(52) U.S. Cl. .............. 701/431; 701/1; 701/2; 701/32.3; 701/438; 340/425.5; 340/436; 340/461; 340/525; 340/907; 707/999.104; 707/999.107; 348/143; 348/148; 348/565; 382/104

(58) Field of Classification Search .............. 701/2, 32.6, 701/32.8, 1, 32.3, 431, 438; 348/E5.024, 348/E5.042, E5.051, E5.067; 455/13.1, 12.1, 455/41.2; 244/189, 91, 115, 145; 340/932.2, 340/425.5, 436, 461, 525, 907, 933, 936, 340/937; 382/104
See application file for complete search history.

(56) References Cited

U.S. PATENT DOCUMENTS

| | | | | |
|---|---|---|---|---|
| 6,965,816 B2* | 11/2005 | Walker | | 701/16 |
| 7,113,852 B2* | 9/2006 | Kapadia et al. | | 701/36 |
| 7,411,493 B2* | 8/2008 | Smith | | 340/539.18 |
| 8,102,427 B2* | 1/2012 | Jung et al. | | 348/208.1 |
| 8,103,211 B1* | 1/2012 | Fujisaki | | 455/3.06 |
| 2003/0203717 A1* | 10/2003 | Chuprun et al. | | 455/12.1 |
| 2005/0065682 A1* | 3/2005 | Kapadia et al. | | 701/35 |
| 2007/0109411 A1* | 5/2007 | Jung et al. | | 348/207.1 |
| 2007/0274563 A1* | 11/2007 | Jung et al. | | 382/103 |
| 2008/0043108 A1* | 2/2008 | Jung et al. | | 348/207.1 |

* cited by examiner

*Primary Examiner* — McDieunel Marc
(74) *Attorney, Agent, or Firm* — Lin & Associates IP, Inc.

(57) ABSTRACT

A remote vehicle management system by video radar includes a camera array installed on the vehicle to capture and generate video data, video recognition units receiving the video data and converting into an object data stream, a vehicle database including static and dynamic data, an environment management unit generating a video radar data stream based on the object data stream and, a wireless transfer unit transmitting the radar data stream in a wireless medium, and a remote device reconstructing an illustrative screen based on the received video radar data stream by using specific icons or symbols, which is used to assist the operator of the vehicle to fully understand the actual situation so as to alleviate the human workload, reduce human mistakes and improve the efficiency of the vehicle management.

7 Claims, 1 Drawing Sheet

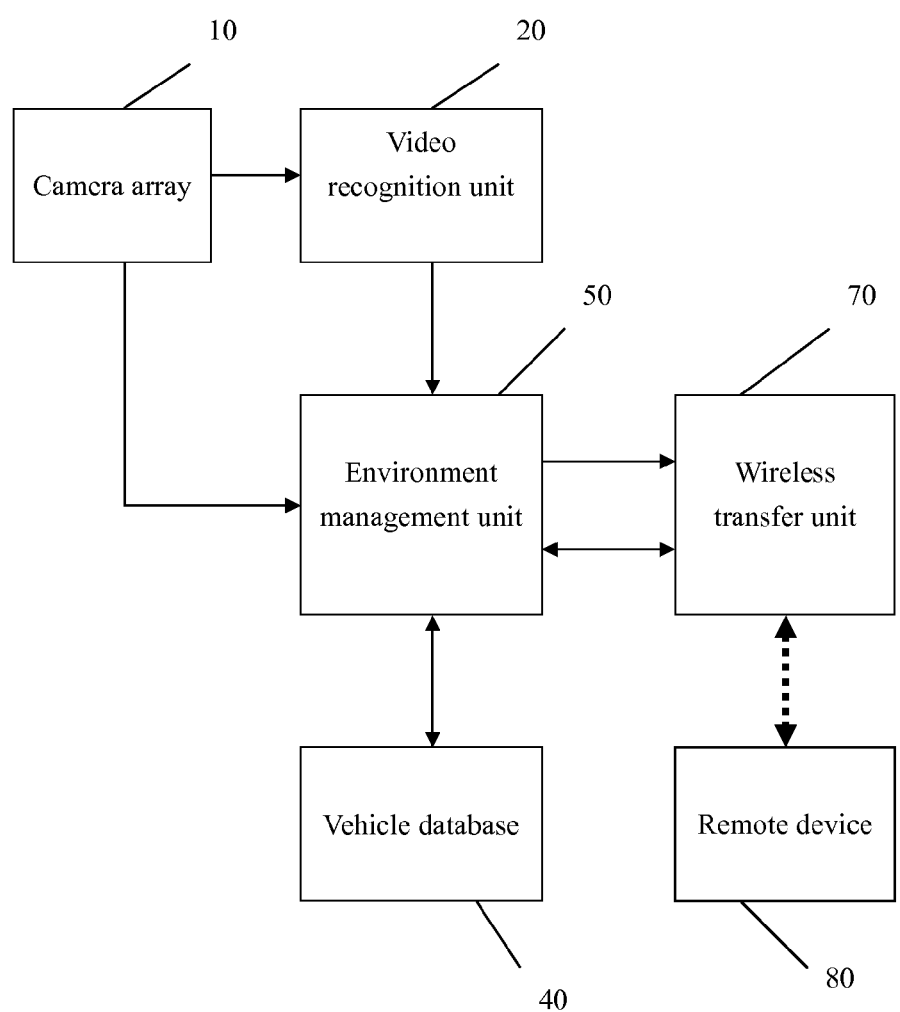

REMOTE VEHICLE MANAGEMENT SYSTEM BY VIDEO RADAR

BACKGROUND OF THE INVENTION

1. Field of the Invention

The present invention generally relates to a remote vehicle management system, and more specifically to using video radar so as to improve the efficiency of vehicle management, and prevent any possible human mistakes.

2. The Prior Art

Recently, telematics has been a hot topic in the vehicle industry around the world. However, owing to limited bandwidth available, it is substantially constraint to respond to actual scene in real time as required by automatic remote management.

Additionally, remote management for cars or vehicles strongly depends on wireless communication technology, but only little amount of information can be smoothly transferred through current wireless channel with limited bandwidth resource, such as Global Positioning System (GPS) coordinate, part of videos or scaled down videos. Therefore, the driver of the vehicle still needs to send back some real time information to the remote control center through mobile phone or radio handset for correct determination by the operator of the remote control center, and then the operator takes suitable measures, like issuing command or remotely controlling the vehicle.

One of the shortcomings in the prior arts is that the remote control center can not always keep track of the current location of the vehicle, and especially can not constantly and smoothly receive the videos desired, if the GPS function fails or radio communication quality deteriorates. Furthermore, the driver fails to regularly report the current situation if the connection with the vehicle is lost, the vehicle is stolen, or the driver abruptly faints or gets hurt due to traffic accident, or even carelessly forgets. At this time, the operator can not correctly determine what happens to the vehicle. Another problem is that if the vehicle runs in a wrong route but the driver still reports normal situation, the remote control center can not further examine the truth.

The operator of the remote control center generally has to view the current or recorded videos around the vehicle to definitely manage the vehicle. However, wireless bandwidth is limited such that it is very difficult to receive successive videos used to monitor the traffic situation without missing some videos or to make sure that every cargo is in right location of the vehicle. Instead, it is usual to transfer a smaller portion of videos previously compressed from the original videos, or just a local part of the videos, or some intermittent videos at a specific period. As a result, the received videos may be obscure, damaged or even lost.

However, it is apparent for the remote management application that the wireless bandwidth still becomes insufficient in the upcoming future regardless of how the wireless technology is improved because of huge amount of videos to be transferred. And, the vehicle easily loses the connection with remote control center.

The present technology can only provide limited information for communication, such as the location in the satellite map, the smaller or intermittent video for the current environment, radio communication or mobile phone information, so video information is strongly needed to precisely capture real situation. In general, the video information basically consists of an extremely huge volume of color data corresponding to millions of pixels, and it also takes a lot of resources to transfer. Moreover, it still needs to manually identify the objects present in the video information. Even if a person can afford to watch or examine 4 videos at a time, the ability of perception and determination still seems insufficient and may decay over time. For example, there is a train with 8 railway carriages, each equipped with one camera to capture the surrounding video, so the person has to constantly watch and examine 8 videos from 8 cameras. For 2 trains, there are 16 videos. As a result, it is an intense challenge to simultaneously capture all the videos and quickly identify the possible problem. Especially, it usually takes hours of manpower to examine the successive videos to identify a single event.

Therefore, it is greatly desired to provide a remote vehicle management system by video radar, which employs videos recognition technology to identify any target object in the video, and then transfers a little amount of information with easily understood text or icons to indicate the actual traffic situation to the remote device, thereby solving the above problems in the prior arts.

SUMMARY OF THE INVENTION

A primary objective of the present invention is to provide a remote vehicle management system by video radar used to overcome the above-mentioned shortcomings in the prior arts. According to the present invention, the remote vehicle management system generally comprises a camera array, at least one video recognition unit, a vehicle database, an environment management unit, a wireless transfer unit, and a remote device. Thus, video radar is provided by use of the camera array to implement remote vehicle management.

The camera array may comprise one or more cameras, installed around and/or inside a vehicle to capture the surroundings and generate corresponding video data. Each video recognition unit connected to at least one camera in the camera array receives the video data, performs a video recognition process to recognize any object present in the video data, and generates an object data stream related to the objects recognized. The vehicle database comprises static data and dynamic data. The environment management unit receives the object data stream, the video data, the static data and the dynamic data of vehicle database, and determines some events, and generates and transfers a video radar data stream to the wireless transfer unit for wireless transferring to the remote device. The remote device reconstructs an integrated illustrative screen based on the video radar data stream by using specific icons, alarm symbols and/or alarm texts to indicate the object(s) recognized and show the alarm information.

Therefore, the present invention reconstructs the illustrative screen to assist the operator of the control center to easily capture and understand the actual situation around the vehicle, and also provides real time alarm to help the operator to take measures if certain specific event happens.

BRIEF DESCRIPTION OF THE DRAWINGS

The present invention can be understood in more detail by reading the subsequent detailed description in conjunction with the examples and references made to the accompanying drawings, wherein:

FIG. 1 shows a schematic diagram to illustrate a remote vehicle management system by video radar according to the present invention.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Please refer to FIG. 1, the remote vehicle management system by video radar according to the present invention, which assists the remote operator to capture the actual surrounding situation by providing an illustrative screen reconstructed, comprises a camera array 10, at least one video recognition unit 20, a vehicle database 40, an environment management unit 50, a wireless transfer unit 70, and a remote device 80.

The camera array 10 comprises one or more cameras, and each camera is installed on and/or inside a vehicle (not shown) to capture the surrounding environment and generate corresponding video data. In the present invention, the vehicle may be a transportation vehicle, like a car for land use, a mining vehicle under ground, a ship on water surface, a submarine underwater or an airplane in the air. Besides, the camera can be equipped with at least one of the infrared lens, zoom lens, pan/tilt module and wide angle lens.

Each video recognition unit 20 is connected to at least one camera in the camera array to receive the video data, perform an video recognition process so as to recognize all the objects present in the video data, such as a driver, visitor, cargo in the vehicle, and/or a car, building, road, road lane, crash barrier, passenger, street lamp, traffic/mileage sign out of the vehicle, and generate an object data stream related to all the object recognized. Furthermore, the objects recognized may further be specified by at least the location and/or the name of the object.

More specifically, the video recognition unit 20 can implemented as a single integrated circuit (IC) chip, or a central processing unit (CPU) or micro processor (MCU) running some specific software program.

The vehicle database 40 comprises static data and dynamic data. The static data may comprise at least one of the length/width, radius of gyration, safe braking distance and accelerating ability of the vehicle. The dynamic data is generated by at least one dynamic sensing unit, and may comprise at least one of dynamic speed, direction and GPS information of the vehicle. The dynamic sensing unit comprises at least one of a speed sensor, direction sensor and global positioning system (GPS) sensor. The vehicle database 40 may further comprise mission route information which illustrates a mission route and comprises GPS coordinates, city names, and/or road signs related to the mission route.

The environment management unit 50 receives the object data stream, the video data, the static data and the dynamic data from the vehicle database 40, determines specific events, generates and transfers a video radar data stream which integrates some of the object data stream, the static data and the dynamic data of the vehicle database and event data, and further transfers the specific video data related to the video data based on a video streaming management algorithm to the wireless transfer unit 70.

The above-mentioned video streaming management algorithm includes an event driven rule and/or an object driven rule. In the event driven rule, it is determined whether the specific event happens, and then the specific video data is transferred only when the specific event happens. In the object driven rule, it is determined whether at least one object recognized is updated in the object data stream of the video radar data stream, and the specific video data is transferred only when the at least one object recognized is updated.

The specific event may comprise at least one of a collision event, (front/back/side) collision alarm event, wrong route event, bias driving event, tired driver event and abrupt braking event. More specifically, the collision event indicates the vehicle installed with the camera array collides with another vehicle, the collision alarm event means the distance between the vehicle and another vehicle nearby is equal or less than the predetermined safety distance, the wrong route event happens when the current route does not match the route specified in the mission route information, the bias driving event is determined when the distance between the vehicle and the road lane is equal or less than the predetermined safe lane distance, the tired driver event is determined when the rate of changing the road lane for the vehicle is equal or higher than the predetermined rate or the change rate of speed is equal or higher than the predetermined change rate of speed, and the abrupt braking event shows the braking rate is equal or higher than the predetermined braking rate. It should be noted that the above examples are only exemplary for reference and not directed to limit the scope of the present invention. Thus other events with potential risk to the vehicle or the object(s) nearby are also included in the present invention.

For the case that the object is updated, the object data stream in the video radar data stream is updated, and it also implies that at least one object recognized is updated. For example, a new object recognized as a passenger crossing the road is added into the object data stream, or the object indicating the passenger in the previous object data stream is deleted in the current object data stream because the passenger completes crossing the road and thus disappears in the video. Another example is that the driver or visitor leaves the seat of the vehicle, or the cargo is taken off the vehicle, so the corresponding object in the object data stream is eliminated.

The specific video data from the environment management unit 50 may comprise at least one of the original video data, the compressed video data (such as 320×240 video compressed from 640×480 image), the intermittent video data and the partial video data which is a part of the original video data. The partial video data may at least contain the video corresponding to the updated or meaningful object. For instance, in the collision event, the partial video data is 1/4 portion of the original video showing the collided object, or in the collision alarm event, only the most nearby object is included in the partial video. Thus, the amount of transfer data is reduced, the transfer loading is greatly improved, and meanwhile the partial video corresponds to the specific event and can be easily and clearly understood. Moreover, the intermittent video data is generated from the original video data at a predetermined period, such as the time for 4 videos frames, that is, one selected from 4 successive videos frames, thereby suitably representing a slow event.

For example, in the successive videos frame 1 to 8, the video frame 1 to 5 containing an object as a white car, the videos frame 6 to 7 containing two objects indicating the white car and a passenger, respectively, and the last video frame 8 containing only the passenger, the video streaming management algorithm reserves and transfers the video frame 1, 6 and 8, and the video frame 2, 3, 4, 5 and 7 are not transferred because the video frame 2, 3, 4 and 5 contains the same object as the video frame 1, and the video frame 7 is the same as the video frame 6. Therefore, 3/8 bandwidth is used.

Another example is the case that the specific video data is transferred only when the specific event happens. If there are successive video frame 1 to 10, wherein the video frame 4 shows the back collision alarm, and the video frame 7 indicates the abrupt braking alarm so that there is some risk to collide, the algorithm in the present invention reserves and transfers the video frame 4 and 7 because of correspondence relationship and no specific event happens in the video frame 1, 2, 3, 5, 6, 8, thus directly dropped. In this case, only event-driven video stream is transferred and 2/8 bandwidth is used.

Owing to extremely huge amount of video data in the conventional scheme, data transfer is often blocked when the available bandwidth is insufficient. However, the video streaming management algorithm of the present invention can smoothly transfer suitable amount of video data based on the available bandwidth so as to avoid transferring huge data, thereby improving the operation efficiency and reliability for the whole system.

The wireless transfer unit 70 transfers the video radar data stream and/or the specific video data to the remote device 80 by wireless network. The remote device 80 may be a control center device or another vehicle. The wireless network used in the wireless transfer unit 70 may include GSM, GPRS, 3G WCDMA, 3.5G, 3.75 G, LTE, WIFI and/or WIMAX, satellite communication, wireless communication and/or microwave communication. Additionally, the wireless transfer unit 70 may further provide communication security function, comprising Virtual Private Network (VPN) and firewall to prohibit unauthorized invasion.

The remote device 80 receives the video radar data stream and/or the specific video data from the wireless transfer unit 70, and reconstructs an illustrative screen corresponding to the environment in or out of the vehicle, such as the arrangement schematic for the cargo in the vehicle or the eagle view of the outside environment. The illustrative screen shows the vehicle and all the objects recognized by specific icons or/and the original image of the objects. Specifically, the specific event is indicated by the specific symbol, or some text or numeral can also be used to show the illustrative information, such as speed or warning, such that the actual situation for the vehicle can be simply and clearly illustrated and the operator of the remote device 80 thus easily understands and takes some measures necessary.

For example, the block symbol " " can be used to indicate the vehicle/car with different colors to distinguish the vehicle and others nearby; the direction of the arrow symbol "→" shows the traveling direction and the length of the arrow symbol "→" represents the magnitude of the speed; the straight or oblique line is indicative of the road or lane; the collision alarm event is indicated by the star symbol " "; and the distance between two blocks shows the relative actual distance between the corresponding two objects. Additionally, some certain region in the illustrative screen, such as the region at the bottom right corner, can be selected to show the speed or alarm information, like "too left" or "too right".

It should be noted that the specific icons, symbols and the manner to present them in the above description for the illustrative screen are only exemplary and illustrative, and not intended to limit the scope of the present invention.

Moreover, the present invention may comprise auxiliary sensing unit, which includes at least one of the RFID (radio frequency identification), laser element, super sonic element and photosensitive sensor, for generating the corresponding auxiliary sensing information provided for the environment management unit 50 as reference. For example, the RFID may sense the RFID tag attached to the cargo, and determine whether the cargo is correctly delivered to the customer when the vehicle reaches the destination. Also, the laser element, super sonic element or photosensitive sensor can be used to sense the person in the vehicle, such as the driver or visitor, and determine if he/she leaves the seat.

The present invention may further include a video storage unit (not shown) to receive the video data from the camera array 10, and store part or whole of the video data for reading out later.

Additionally, the environment management unit 50 may also receive the command information from the remote device 80 through the wireless transfer unit 70 in the wireless network, and perform the operation based on the command information. For example, the corresponding operation for the command information is to play prompting voice, interrupt prompting image or display prompting message. Also, the remote device 80 may send the compulsory control command to remotely steer the vehicle when some emergency event happens. For example, the remote device 80 may compulsorily turn the vehicle to avoid colliding with the crash barrier when the driver is abruptly ill and can not correctly steer the vehicle.

Therefore, the remote vehicle management system of the present invention may utilize the remote device to reconstruct the illustrative screen, thereby assisting the operator of the remote device to easily understand and control the actual situation around the vehicle. Meanwhile, appropriate alarm information is provided by the texts or icons to point out some specific event happening. Thus, the efficiency of remote management for the vehicle is greatly improved because any human mistake or carelessness is prevented, and the safety for the driver of the vehicle is further guaranteed.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A remote vehicle management system by video radar, comprising:
  a camera array, comprising one or more cameras, installed around a vehicle to capture and generate video data;
  at least one video recognition unit, each connected to at least one camera in the camera array, used to receive the video data and perform a video recognition process to recognize any object present in the video data, and generating an object data stream which comprises at least a location a name of the object(s) recognized;
  a vehicle database, comprising static data and dynamic data, wherein the dynamic data is generated by at least one dynamic sensing unit;
  an environment management unit, receiving the object data stream, the video data, the static data and the dynamic data of the vehicle database, determining by a processor specific events, generating and transferring a video radar data stream by integrating some of the object data stream, the static data and the dynamic data of the vehicle database and events data, and transferring the specific video data related to the video data based on a video streaming management algorithm by the processor;
  a wireless transfer unit, receiving and wireless transmitting the video radar data stream and the specific video data; and
  a remote device, receiving the video radar data stream and the specific video data, and reconstructing an illustrative screen corresponding to an environment in or out of the vehicle, wherein the illustrative screen consists of specific icons, alarm symbols or words to indicate the vehicle, the object(s) and road lane(s) recognized, and present an alarm message.

2. The system as claimed in claim 1, wherein said camera is further provided with at least one of an infrared lens, a zoom lens, a pan/tilt module and a wide angle lens, the video recognition unit is an integrated circuit (IC) chip, a central processing unit or micro processor running a software, and the object is a driver, visitor or cargo in the vehicle, and a passenger, car, brim of a road, road lane, roadside railing, building or traffic sign out of the vehicle.

3. The system as claimed in claim 1, wherein said static data comprises at least one of length/width, radius of gyration, safe braking distance and accelerating ability of the vehicle, the dynamic sensing unit comprises at least one of a speed sensor, direction sensor and global positioning system (GPS) sensor, the dynamic data comprises at least one of dynamic speed, direction and GPS information of the vehicle, and the vehicle database further comprises a mission route information which illustrates a mission route and comprises GPS coordinates, city names, and road signs related to the mission route.

4. The system as claimed in claim 1, wherein said video streaming management algorithm comprises an event driven rule or an object driven rule, the event driven rule comprises determining whether a specific event happens, and transferring the specific video data only when the specific event happens, and the object driven rule comprises determining whether at least one object recognized is updated in the object data stream of the video radar data stream, and transferring the specific video data only when the at least one object recognized is updated, said specific events comprising at least one of a collision event, (front/back/side) collision alarm event, wrong route event, bias driving event, tired driver event and abrupt braking event, and said specific video data comprising at least one of said video data, a compressed video data, an intermittent video data and a partial video data, said compressed video data generated by compressing said video data, said intermittent video data generated from said video data at a predetermined period, and said partial video data being a part of said video data.

5. The system as claimed in claim 1, further comprising an auxiliary sensing unit used to generate auxiliary sensing information to the environment management unit, wherein said auxiliary sensing unit comprises at least one of a RFID (radio frequency identification), laser device, thermal sensor, super sonic device and photosensitive sensor.

6. The system as claimed in claim 1, wherein said wireless transfer unit further receives command information from the remote device in a wireless network, and passes the command information to the environment management unit to perform corresponding operation, the wireless network comprises GSM, GPRS, 3G WCDMA, 3.5G, 3.75 G, LTE, WIFI, WIMAX, satellite communication, radio frequency communication and/or microwave communication, and the wireless transfer unit further provides communication security function, comprising Virtual Private Network (VPN) and firewall to prohibit unauthorized invasion.

7. The system as claimed in claim 1, further comprising a video storage unit used to receive the video data from the camera array and store a part or whole of the video data to be read.

* * * * *